Nov. 9, 1948.                K. PESTRECOV                2,453,260
                        THREE ELEMENT OBJECTIVE LENS
                           Filed March 27, 1947
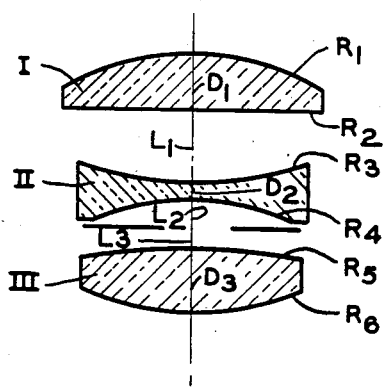
F/2.7    FOCAL LENGTH    100
| LENS | | | |
|---|---|---|---|
| I | $R_1$ = 40.94 | $D_1$ = 8.74 | $N_D$ = 1.6170 |
|   | $R_2$ = ∞    | $L_1$ = 11.05 | $\nu$ = 55.0 |
| II | $R_3$ = -55.65 | $D_2$ = 2.78 | $N_D$ = 1.6490 |
|    | $R_4$ = 39.75  | $L_2$ = 7.63 | $\nu$ = 33.8 |
|    |               | $L_3$ = 7.63 |              |
| III | $R_5$ = 107.56 | $D_3$ = 9.54 | $N_D$ = 1.6170 |
|     | $R_6$ = 43.33  |              | $\nu$ = 55.0 |
KONSTANTIN PESTRECOV
INVENTOR
BY
ATTORNEY Patented Nov. 9, 1948

2,453,260

UNITED STATES PATENT OFFICE 2,453,260

THREE ELEMENT OBJECTIVE LENS

Konstantin Pestrecov, Rochester, N. Y., assignor to Bausch & Lomb Optical Company, Rochester, N. Y., a corporation of New York Application March 27, 1947, Serial No. 737,543

3 Claims. (Cl. 88—57)

The present invention relates to an objective lens for photographic or projection purposes of the three-element type comprising a dispersive element positioned between two outer collective elements.

In known objective lenses of this type, comatic aberration is unsatisfactorily great whenever the relative aperture of the lens is high, such as for instance f/2.7 and the spherical, chromatic, and astigmatic aberrations, flatness of the field, and distortion are satisfactorily corrected.

It is an object of the present invention to provide a lens system of the above-mentioned type in which comatic aberration is greatly reduced or substantially eliminated without substantially reducing or affecting the other corrections.

Further objects and advantages will be apparent by reference to the following description and accompanying drawing wherein a preferred embodiment of this invention is illustrated together with the numerical data pertaining thereto.

In the present objective lens, the objects of this invention are attained by making the collective outer elements from an optical glass having a refractive index which is less than the refractive index of the optical glass of the middle dispersive element by a difference between 0.02 and 0.045. This condition can be satisfied in the preferred form of this invention by making the collective elements I and III from dense barium crown optical glass and the dispersive element II of extra dense flint optical glass. Also the curvature of the rear surface of the dispersive element is made stronger than the curve of its front surface by a ratio between 1.2 and 1.6, the "front surface" being defined as the surface nearest to lens I on the longer conjugate side of the objective lens.

A further condition inherent in this objective lens is that the ratio between the radius of curvature of the front surface $R_1$ of the front collective element I to the radius of curvature of the rear surface $R_6$ of the rear collective element III lies between 0.90 and 1.01 and the numerical value of the radius of curvature of the rear surface $R_6$ bears a ratio to the effective focal length of the objective lens of between 0.45 and 0.368.

In regard to the spaces between the collective and dispersive elements of the system, the front space $L_1$ is made between 1.25 and 1.8 times greater than the rear space $L_2+L_3$, and a diaphragm diagrammatically illustrated in the drawing is located in said rear space.

The following data characterize one form of objective lens which is made in accordance with my invention. This lens has a focal length of 100 and an aperture of f/2.7.

| Lens | Radius | Thickness or Separation | Refractive Index | Abbe $\nu$ Number |
|---|---|---|---|---|
| I | $R_1=+40.94$ | $D_1=8.74$ | $n_D=1.617$ | $\nu=55.0$ |
|   | $R_2=\infty$ | $L_1=11.05$ | | |
| II | $R_3=-55.65$ | $D_2=2.78$ | $n_D=1.649$ | $\nu=33.8$ |
|   | $R_4=+39.75$ | $L_2+L_3=7.63$ | | |
| III | $R_5=+107.56$ | $D_3=9.54$ | $n_D=1.617$ | $\nu=55.0$ |
|   | $R_6=-43.33$ | | | |

As shown on the drawing, the Roman numerals in the first column refer to the lens elements which are numbered from front to rear, $n_D$ is the index of refraction for the D line, $\nu$ is the dispersion index, $R_1-R_6$ are the radii of curvature of the respective surfaces numbered from front to rear with the + and − signs respectively referring to surfaces which are convex and concave to the incident light, $D_1-D_3$ are the thicknesses of the elements and $L_1$ to $L_3$ are the air spaces between the elements.

Although a typical example of an objective lens designed in accordance with the above prescribed conditions is shown and described, it will be understood that this example is not exclusive and other values may be substituted in the numerical data given within the prescribed limitations without departing from the spirit of the invention as defined in the appended claims.

I claim:

1. An objective lens of relatively high aperture corrected for spherical, chromatic, astigmatic, and comatic aberrations, flatness of field, and distortion, comprising aligned front and rear collective lenses, and a dispersive element aligned intermediate of said collective elements and having air spaces therebetween, the foremost of said spaces nearest to the longer conjugate of the objective lens being between 1.25 and 1.8 times the rearmost of said spaces and the refractive index of said dispersive element exceeding the refractive index of the collective elements by a difference between 0.02 and 0.045, the dispersive power of the dispersive element being numerically between 2.74 and 3.1 times the power of the objective lens, and the ratio between the radius of curvature of the front surface of the front collective element to the radius of curvature of the rear surface of the rear collective element lies between 0.90 and 1.01.

2. An objective lens of relatively high aperture corrected for spherical, chromatic, astigmatic, and comatic aberrations, flatness of field and distortion, comprising two collective and one dispersive simple aligned elements separated by air spaces therebetween, said dispersive element being located between said collective elements and made of glass having a refractive index which exceeds the refractive index of the glass of the collective elements by a difference between 0.02 and 0.045, the curvature of the rear surface of the dispersive element being between 1.2 and 1.6 times stronger than the curvature of the front surface of the dispersive element, the space between the dispersive element and the front collective element being between 1.25 and 1.80 times greater than the space between the dispersive element and the rear collective element, and the ratio of the numerical value of the radius of curvature of the rear surface of the rear collective element to the effective focal length of the objective lens being between 0.368 and 0.450.

3. An objective lens numerically defined by the following data:

E. F.=100    Rel. Aperture=f/2.7

| Lens | Radius | Thickness or Separation | Refractive Index | Abbe $\nu$ Number |
|---|---|---|---|---|
| I | $R_1=+40.94$ $R_2=\infty$ | $D_1=8.74$ $L_1=11.05$ | $n_D=1.617$ | $\nu=55.0$ |
| II | $R_3=-55.65$ $R_4=+39.75$ | $D_2=2.78$ $L_2+L_3=7.63$ | $n_D=1.649$ | $\nu=33.8$ |
| III | $R_5=+107.56$ $R_6=-43.33$ | $D_3=9.54$ | $n_D=1.617$ | $\nu=55.0$ | wherein the Roman numerals refer to the lens elements numbered from front to rear, $n_D$ is the refractive index, $\nu$ is the dispersion index, $R_1$ to $R_6$ are the radii of the surfaces from front to rear, $D_1$ to $D_3$ are the thicknesses of the elements and $L_1$ to $L_3$ are the air spaces between the elements.

KONSTANTIN PESTRECOV.

REFERENCES CITED

The following references are of record in the file of this patent:

UNITED STATES PATENTS

| Number | Name | Date |
|---|---|---|
| 1,035,408 | Beck | Aug. 13, 1912 |
| 1,892,162 | Richter | Dec. 27, 1932 |
| 1,987,878 | Tronnier | Jan. 15, 1935 |
| 2,064,550 | Lee | Dec. 15, 1936 |
| 2,430,550 | Altman et al. | Nov. 11, 1947 |

FOREIGN PATENTS

| Number | Country | Date |
|---|---|---|
| 4,714 | Great Britain | 1911 |